UNITED STATES PATENT OFFICE.

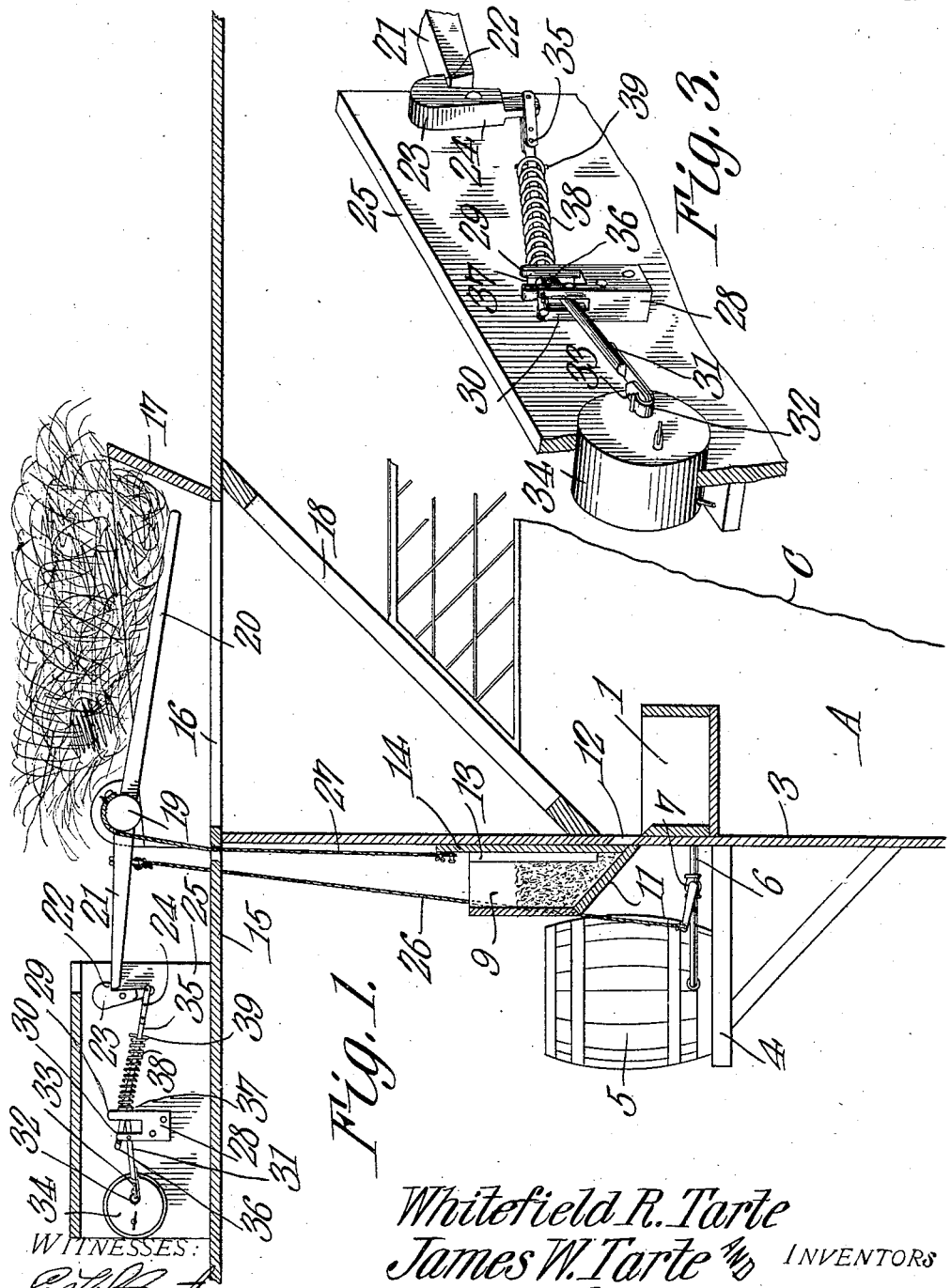

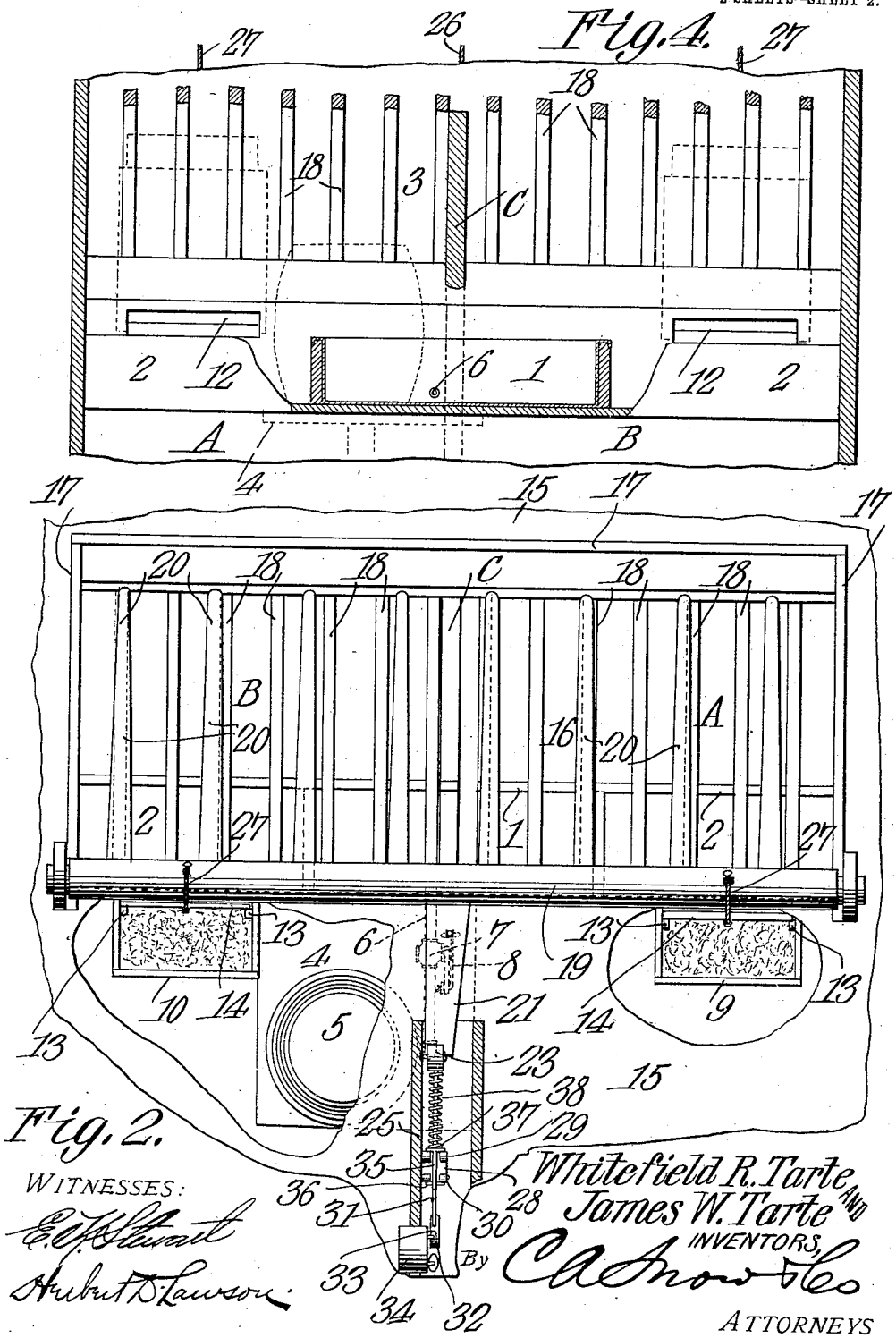

WHITEFIELD R. TARTE AND JAMES W. TARTE, OF BELLINGHAM, WASHINGTON.

TIME-CONTROLLED STOCK-FEEDING APPARATUS.

No. 868,227.      Specification of Letters Patent.      Patented Oct. 15, 1907.

Application filed February 23, 1907. Serial No. 358,920.

*To all whom it may concern:*

Be it known that we, WHITEFIELD R. TARTE and JAMES W. TARTE, citizens of the United States, residing at Bellingham, in the county of Whatcom and State of Washington, have invented a new and useful Time-Controlled Stock-Feeding Apparatus, of which the following is a specification.

This invention relates to apparatus for feeding live stock and its object is to provide time controlled means whereby the apparatus will be actuated at predetermined periods so as to direct water, feed, etc., into proper receptacles provided therefor.

The apparatus is particularly designed for use in barns, stables, and the like, and dispenses with the services of an attendant at the times when it is desired to feed the stock.

With the above and other objects in view the invention consists of certain novel features of construction and combinations of parts which will be hereinafter more fully described and pointed out in the claims.

In the accompanying drawings is shown the preferred form of the invention.

In said drawings: Figure 1 is a section through the apparatus and showing the time controlled releasing mechanism in elevation; Fig. 2 is a plan view of the apparatus, portions thereof being broken away; Fig. 3 is an enlarged perspective view of the time controlled releasing mechanism; and Fig. 4 is a transverse section through two stalls and showing feed and watering troughs adapted to be supplied by the mechanism constituting the present invention, the watering trough being shown in section and the two feed troughs partly in elevation.

Referring to the figures by characters of reference, A and B are two stalls separated by a partition C and extending through this partition and into each of the stalls is a watering trough 1. A feed trough 2 is arranged within each of the stalls and these troughs are supported preferably by the rear wall 3 of the stalls. Arranged upon the opposite face of this wall 3 is a shelf 4 on which is mounted a water receptacle 5. An outlet pipe 6 extends from this receptacle to the watering trough 1 and has a plug valve 7 from the stem of which extends an arm 8. Connected to the wall 3 are bins 9 and 10 each of which has its bottom inclined as shown at 11 so as to direct the contents of the bin through an opening 12 in wall 3 and into the adjoining trough 2. Each bin has guide cleats 13 and a sliding closure 14 is arranged between these cleats and the wall 3 and normally closes the opening 12. The floor 15 of the loft above the stall has an opening 16 therein extending throughout the width of the stalls and surrounded on three sides by a wall 17. Inclined slats 18 are secured between the wall 3 and floor 15 above the stalls A and B and constitute racks for supporting hay within reach of the stock.

Journaled upon the side portions of wall 17 and extending throughout the width of the opening 16 is a rock shaft 19 having a series of fingers 20 extending therefrom and adapted to swing downward into the opening 16. Extending from this shaft is a holding arm 21 adapted to bear against a shoulder 22 formed by the head 23 of a lever 24. This lever is fulcrumed upon a suitable support 25 and constitutes a trigger. A rope 26 is secured at one end to the arm 21 and at its other end to the arm 8 of valve 7. Ropes 27 are also secured to the closures 14 and to the shaft 19.

Secured upon the support 25 is a block 28 having a pair of guide fingers 29 extending upward therefrom and another pair of holding fingers 30 extending therefrom, said holding fingers being shorter than the guide fingers. Fulcrumed between these holding fingers is a tripping lever 31 having a hooked plate 32 at one end adapted to engage the winding key 33 of the alarm of a clock 34. This clock is preferably of the Waterbury type and is supported in any preferred manner adjacent the block 28. A rod 35 is pivotally connected to lever 24 and has a stop pin 36 extending through the end thereof. A washer 37 is arranged on this rod and is constantly pressed against the fingers 29 by a coiled spring 38 which is arranged on the rods 35 and bears against a pin 39 extending through the rods 35. It will thus be seen that the spring serves to hold the shoulder 22 normally out of the path of arm 21.

When it is desired to use this apparatus the arm 21 is swung downward and the shoulder 22 placed in position upon the end thereof. Rod 35 is drawn back against the tension of spring 38 and the pin 36 placed back of and in engagement with the finger 30. The alarm of clock 34 is then set to ring at a desired time and lever 31 is placed with its hooked plate in engagement with the key 33. One end of the lever will then rest on the lower surface of rod 35 as shown. When arm 21 is locked in this manner the ropes 26 and 27 become slack and permit arm 8 to swing downward to close valve 7 and slides 14 to close the openings 12. Water can then be placed in receptacle 5 and feed in bins 9. Hay is also placed on the fingers 20 which are supported by locked arm 21 above the opening 16. When the alarm is sounded the key 33 rotates and presses downward on lever 31. Said lever will lift the pin 36 above the fingers 30 and spring 38 will promptly press the trigger 24 out of engagement with arm 21. The hay on fingers 20 will swing them downward and the hay will be discharged upon the rack 18. At the same time cables 26 and 27 will pull up and the water and feed will be free to pass into the respective troughs.

It will be seen that this apparatus is very simple and inexpensive, can be readily placed in a barn or stable and constitutes an efficient means for automatically feeding live stock at predetermined times.

What is claimed is:

1. The combination with a rack; of a rock shaft, fingers extending therefrom and constituting feed supports, an arm extending from the shaft, a holding lever fulcrumed adjacent and disposed to engage the arm to hold the shaft against movement, stationary guide fingers, a spring pressed rod movably mounted between the guide fingers and connected to the lever, holding fingers normally engaged by the rod and disposed to hold the rod against the tension of its spring, a tripping lever disposed to lift the rod out of engagement with the holding fingers to release the spring to actuate the holding lever, means for automatically actuating the tripping lever at a predetermined time.

2. The combination with a rack; of a rock shaft, fingers extending therefrom and constituting feed supports an arm extending from the shaft, a holding lever fulcrumed adjacent and disposed to engage the arm to hold the shaft against movement, stationary guide fingers, a spring pressed rod movably mounted between the guide fingers and connected to the lever, holding fingers normally engaged by the rod and disposed to hold the rod against the tension of its spring, a tripping lever disposed to lift the rod out of engagement with the holding fingers to release the spring to actuate the holding lever, means for automatically actuating the tripping lever at a predetermined time, a trough, a water receptacle communicating therewith, a valve for closing communication between the receptacle and trough, and a flexible connection between the valve and the arm of the rock shaft.

3. The combination with a rack; of a rock shaft, fingers extending therefrom and constituting feed supports, an arm extending from the shaft, a holding lever fulcrumed adjacent and disposed to engage the arm to hold the shaft against movement, stationary guide fingers, a spring pressed rod movably mounted between the guide fingers and connected to the lever, holding fingers normally engaged by the rod and disposed to hold the rod against the tension of its spring, a tripping lever disposed to lift the rod out of engagement with the holding fingers to release the spring to actuate the holding lever, means for automatically actuating the tripping lever at a predetermined time, bins, troughs disposed to receive material therefrom, slidable closures for shutting off communication between the bins and troughs, and flexible connections between said closures and the shaft, said connections being disposed to wind upon the shaft to raise the closures.

In testimony that we claim the foregoing as our own, we have hereto affixed our signatures in the presence of two witnesses.

WHITEFIELD R. TARTE.
JAS. W. TARTE.

Witnesses:
ALFRED E. WOOD,
WILLIAM R. BROWN.